(12) United States Patent
Sharma et al.

(10) Patent No.: US 10,726,502 B2
(45) Date of Patent: Jul. 28, 2020

(54) VARIABLE PROFILES AND PROFILE ORGANIZER

(71) Applicant: Microsoft Technology Licensing, LLC, Redmond, WA (US)

(72) Inventors: Manish Mohan Sharma, San Jose, CA (US); Jonathan Redfern, Truckee, CA (US); Jayant Sai, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/688,039

(22) Filed: Nov. 28, 2012

(65) Prior Publication Data

US 2014/0149843 A1 May 29, 2014

(51) Int. Cl.
*G06Q 50/00* (2012.01)
*G06Q 10/10* (2012.01)

(52) U.S. Cl.
CPC ......... *G06Q 50/01* (2013.01); *G06Q 10/1053* (2013.01)

(58) Field of Classification Search
CPC ............................ G06Q 50/01; G06Q 10/1053
USPC ........................................................ 705/319
See application file for complete search history.

(56) References Cited

U.S. PATENT DOCUMENTS

| | | | | |
|---|---|---|---|---|
| 7,533,153 B1 * | 5/2009 | Wood | ................... | G06Q 10/107 709/206 |
| 2004/0107192 A1 * | 6/2004 | Joao | ....................... | G06Q 10/10 |
| 2005/0177385 A1 * | 8/2005 | Hull | ....................... | G06Q 10/10 705/319 |
| 2007/0250550 A1 * | 10/2007 | Berninger | .............. | G06Q 10/10 |
| 2007/0294092 A1 * | 12/2007 | Calannio | ............... | G06Q 10/06 705/321 |
| 2009/0070334 A1 * | 3/2009 | Callahan | ............... | G06F 21/604 |
| 2010/0269158 A1 * | 10/2010 | Ehler et al. | ....................... | 726/4 |
| 2010/0274815 A1 * | 10/2010 | Vanasco | ........................ | 707/798 |
| 2011/0010297 A1 * | 1/2011 | Sisodraker | .......... | G06F 21/6209 705/52 |

(Continued)

OTHER PUBLICATIONS hiresignals.com. How It Works. waybackmachine. Jun. 25, 2012. [Retrieved on: Jun. 5, 2018]. Retrieved from internet: <URL:https://web.archive.org/web/20120625013649/http://www.hiresignals.com/howItWorks.php>. entire document (Year: 2012).*

(Continued)

*Primary Examiner* — Tamara Griffin
(74) *Attorney, Agent, or Firm* — Schwegman Lundberg & Woessner, P.A.

(57) ABSTRACT

A system may include a profile module and a network interface module. The profile module may be configured to generate a first profile of a user of a social network based, at least in part, on first characteristics related to the user and a second profile of the user based, at least in part, on second characteristics related to the user, at least one of the first plurality of characteristics being the same as at least one of the second characteristics and at least one of the first characteristics being different from at least one of the second characteristics. The network interface module may be configured to transmit the first profile to a device of a third party based on the third party meeting a first criterion and the second profile to a device of the third party based on the third party meeting a second criterion.

14 Claims, 5 Drawing Sheets

(56) References Cited

U.S. PATENT DOCUMENTS

| | | | |
|---|---|---|---|
| 2011/0112976 A1* | 5/2011 | Ryan | G06Q 50/01 705/319 |
| 2011/0131504 A1* | 6/2011 | Shustef | G06F 17/3089 715/745 |
| 2011/0142016 A1* | 6/2011 | Chatterjee | G06Q 30/02 370/338 |
| 2011/0145931 A1* | 6/2011 | Galbreath et al. | 726/28 |
| 2011/0161279 A1* | 6/2011 | Rao et al. | 706/52 |
| 2011/0313943 A1* | 12/2011 | McCagg | G06Q 10/00 705/321 |
| 2013/0066962 A1* | 3/2013 | Scherzinger | G06Q 50/01 709/204 |
| 2013/0097093 A1* | 4/2013 | Kolber | G06Q 10/1053 705/321 |
| 2014/0019533 A1* | 1/2014 | Sherman et al. | G06Q 10/10 709/204 |

OTHER PUBLICATIONS

Bill Boorman. A new extension that makes LinkedIn better from @HireSignals. recruitingunblog.com. Sep. 8, 2012. [ Retrieved on: Jun. 5, 2018]. Retrieved from internet: <URL:http://www.recruitingunblog.com/category/tools-and-applications/>. entire document (Year: 2012).*

* cited by examiner

VARIABLE PROFILES AND PROFILE ORGANIZER

TECHNICAL FIELD

The subject matter disclosed herein generally relates to social network user profiles, what information is included in the profiles, and how the profiles are presented.

BACKGROUND

Social network user profiles are well known. Members of the social network can input characteristics into the social network of various types, including generally personal characteristics and generally professional characteristics. Generally personal information can include name, age, gender, likes and dislikes, and place of residence, among other similar information. Generally, professional information can include information such as the member's job, employment status (e.g., employed, unemployed, employed but looking for a new job, etc), educational degrees, and experience, among other similar information. The social network can incorporate the characteristics into a profile that can be displayed on the social network to users of the social network who can thereby learn about the member corresponding to the profile.

BRIEF DESCRIPTION OF THE DRAWINGS

Some embodiments are illustrated by way of example and not limitation in the figures of the accompanying drawings.

DETAILED DESCRIPTION

Example methods and systems are directed to the generation of variable profiles on a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

While the generation and display of user profiles in social networks is well known, such profiles are conventionally displayed without regard to whether a user of the social network meets one or more criteria. In various examples, a social network may provide a privacy setting that displays one profile of a member to people directly associated with the member, such as friends and family, and a stripped-down version of the profile to people not directly associated with the member, such as a profile that shows only limited information, such as a name and photograph. However, such privacy settings may not take into account a status of a user of the social network who views a member profile apart from a direct association with the member. Further, while a member may establish groups of users who receive, for instance, particular messages from the member, such classifications are based on the input of the member rather than a personal or professional characteristic of the user. As a result, to the extent that the member does not particularly classify each of their associated users, the member may not have control over what kind of profile each of the users of the social network is presented.

Thus, in various circumstances, a particular user may be presented with a profile of the member that displays characteristics that the member may not want a particular user to see. For instance, if a member is currently employed but looking for a new job, the member may not want a coworker at the member's current employer to view a profile that indicates that that the member is looking for a new job. However, the member may want people who work at other companies to see an indication that the member is looking for a new job.

A social network has been developed that obtains member attributes or characteristics and that organizes the characteristics into profiles that can be displayed to users of the social network. However, rather than presenting the profiles indiscriminately or with respect to a specific, narrow selection or classification of the user by the member, the various profiles can be displayed based on a characteristic of the user in relation to the member. Thus, the social network can consider a characteristic of the user in relation to a characteristic of the member in deciding which of one or more profiles to display to the user. The profiles can incorporate some of the same characteristics, but certain characteristics can be included in one profile and omitted in another so that certain types of users see one profile and other types of users see a different profile.

Figure 1:
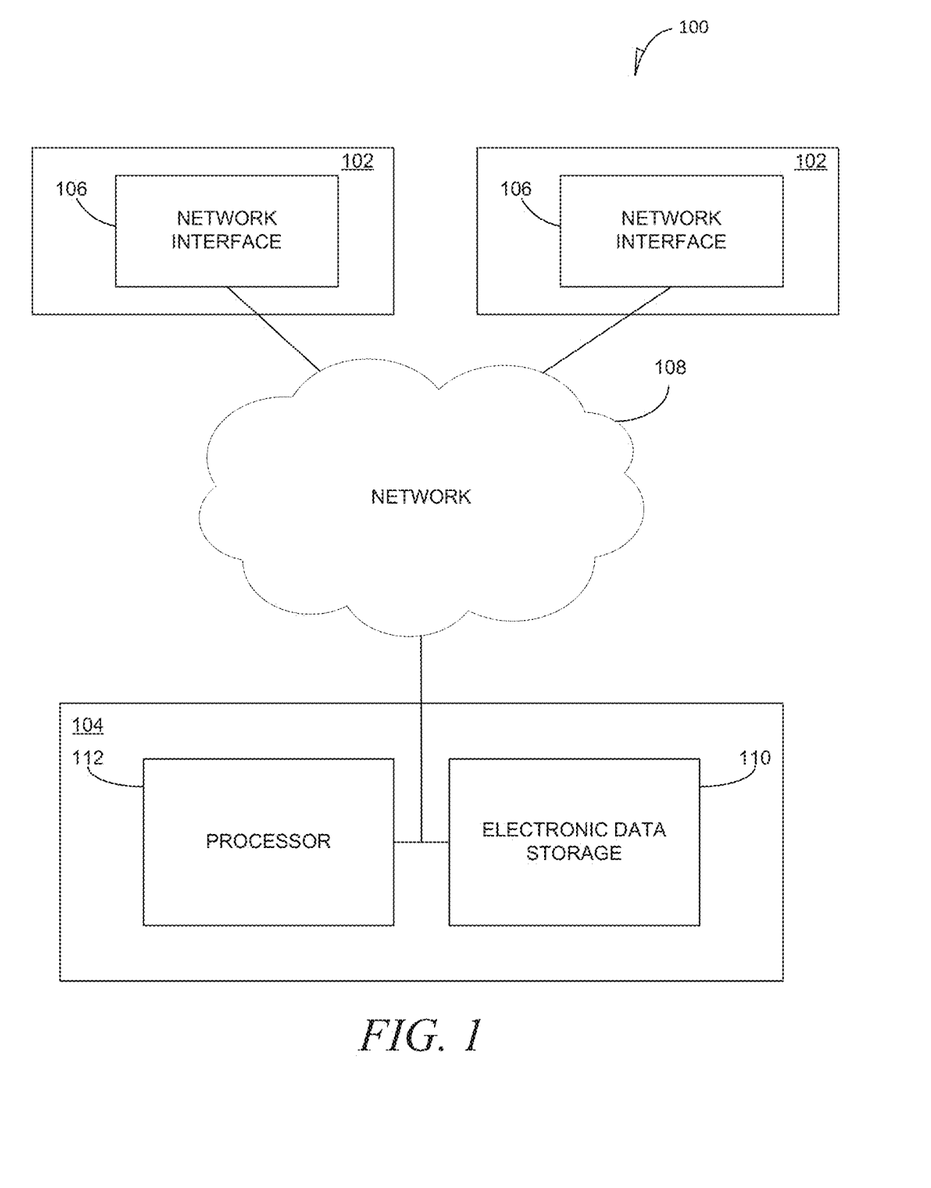
FIG. 1 is a block diagram of a system including user devices and a social network server.

FIG. 1 is a block diagram of a system 100 including user devices 102 and a social network server 104. User devices 102 can be a personal computer, netbook, electronic notebook, smartphone, or any electronic device known in the art that is configured to display web pages. The user devices 102 can include a network interface 106 that is communicatively coupled to a network 108, such as the Internet.

The social network server 104 can be communicatively coupled to the network 108. The server 104 can be an individual server or a cluster of servers, and can be configured to perform activities related to serving the social network, such as storing social network information, processing social network information according to scripts and software applications, transmitting information to present social network information to users of the social network, and receive information from users of the social network. The server 104 can include one or more electronic data storage devices 110, such as a hard drive, and can include a processor 112.

The social network server 104 can store information in the electronic data storage device 110 related to users of the social network, such as in the form of member profiles corresponding to individual members of the social network. For instance, for an individual member, the member's profile can include one or more user characteristics, including, for instance, name, age, gender, profession, prior work history or experience, educational achievement, location, citizenship status, leisure activities, likes and dislikes, and so forth. For an organization, such as a company, the information can include name, offered products for sale, available job postings, organizational interests, forthcoming activities, and the like.

Social networks can variously display member profiles to both members of the social network and non-members of the social network, collectively "users" of the social network. In various examples, members of the social network can establish generalized privacy controls that relate not to personal characteristics of the users of the social network but rather to whether or not the user has a particular, predefined association with the member. Personal characteristics can be understood to be characteristics that the user may have outside of the social network, such as a name, an employer, and so forth. Predefined social network associations can be understood to be associations between a member and various other users, such as being a "friend" or "connected" within the social network. The social network association does not necessarily have any meaning outside of the context of the social network, as "friend" in a social network does not necessarily correspond to a social friend. Thus, in such examples, privacy controls can mean that a user who has a predefined social network association with a member is presented with a profile that includes information related to characteristics of the member, while a user who does not have a predefined social network association with the member is presented a profile with significantly fewer member characteristics.

Member characteristics can vary from other member information, such as personal postings to the social network that may be displayed on the member's profile. For instance, personal postings may include personal messages, occasionally referred to as "status updates," posting articles or links to third-party web pages, and the like. While such member information may communicate information to users of the social network, that information can be understood to be relatively transitory or may be related to near-term activities and may not inform lasting characteristics of the member, unlike characteristics such as name, gender, profession, job, and so forth.

Figure 2A:
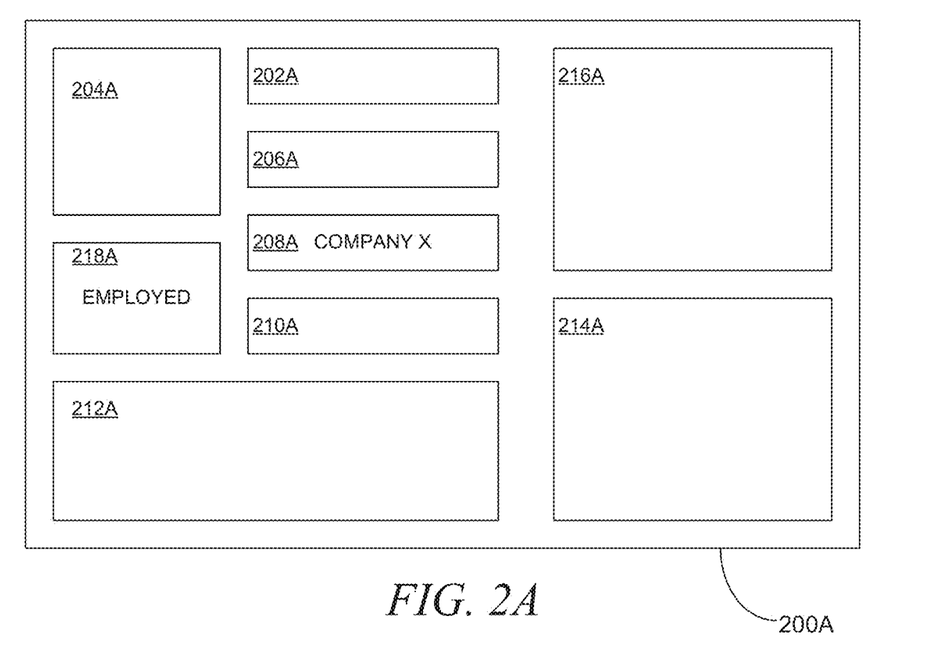
FIGS. 2A and 2B are exemplary, abstracted graphical depiction of member pages.
Figure 2B:
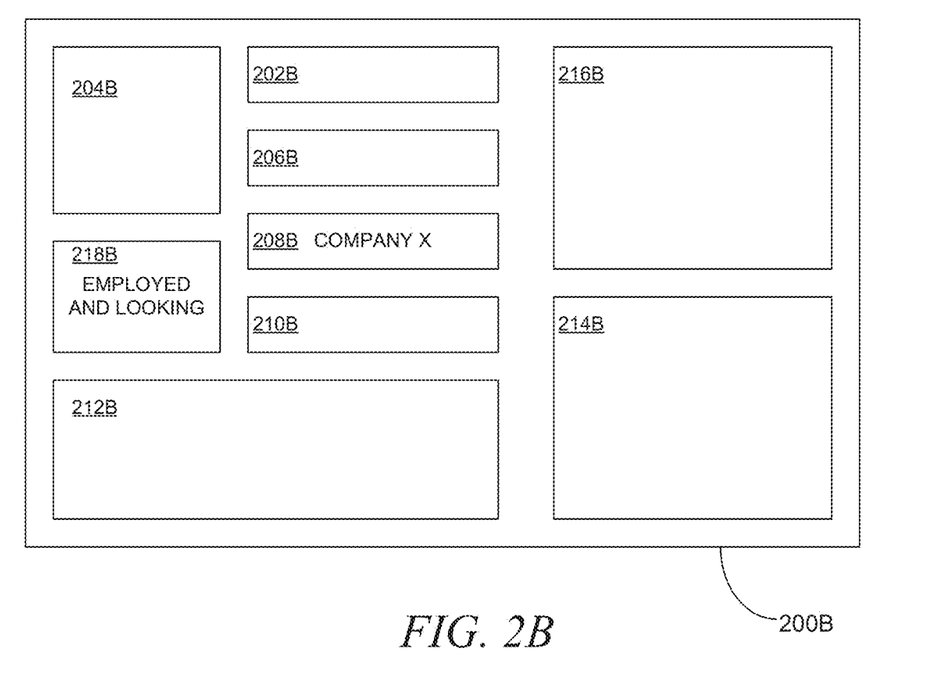

FIGS. 2A and 2B are exemplary, abstracted graphical depiction of member pages 200A, 200B that include fields to display information related to the characteristics of the same member of the social network. The pages 200A, 200B can be displayed on a user interface of the user device 102 when the user accesses the social network information of the member. The user interface of the user device 102 can display the pages 200A, 200B as web pages on a web browser when the user device 102 accesses the server 104 via the Which page 200A, 200B is displayed to the user, however, may depend on characteristics of the user and how those characteristics relate to characteristics of the member.

In the illustrated example, each page 200A, 200B includes a name field 202A, 202B that can display a social network name that corresponds to the member and an image field 204A, 204B to display an image corresponding to the member, such as a photograph. Each page 200A, 200B can include a job title field 206A, 206B, a current employer field 208A, 208B, (in the illustrated example, noting that the member works for "COMPANY X") a location field 210A, 210B, a work history field 212A, 212B, and a contact information field 214A, 214B. All such fields 202, 204, 206, 210, 212, 214 can relate to characteristics of the member. The each page 200A, 200B can further include one or more fields 216A, 216B for information that is not related to characteristics of the member, such as messages posted by the member, recent activities of the member, and so forth as known in the art.

In the illustrated example, page 200A includes a current employment status field 218A. In various examples, page 200B does not include a current employment status field. In the illustrated example, page 200B does include a current employment status field 218B. However, while the current employment status field 218A notes that the member is "EMPLOYED," the current employment status field 218B notes that the member is "EMPLOYED AND LOOKING," meaning that the member is currently employed by COMPANY X but is looking for new employment.

In social networks known in the art, a member may have only one page 200 to display profile characteristics. Alternatively, to the extent that that the member separately categorizes users of the social network, such as by setting privacy controls to limit views of one page to social network acquaintances and another page to non-social network acquaintances or by manually arranging their acquaintances into predetermined groups, one page may be displayed to one group while another page may be displayed to another group. In various examples that do not limit the scope of the uses of variable profiles displayed on various pages 200, the server 104 can display a different pages based on characteristics of the user and a status of a third party such as: a comparative age of the user and a third party; a familial relationship; a mutual friend of acquaintance; a comparative location; a common or related educational background; a common or related club or organization membership; and so forth.

Figure 3:
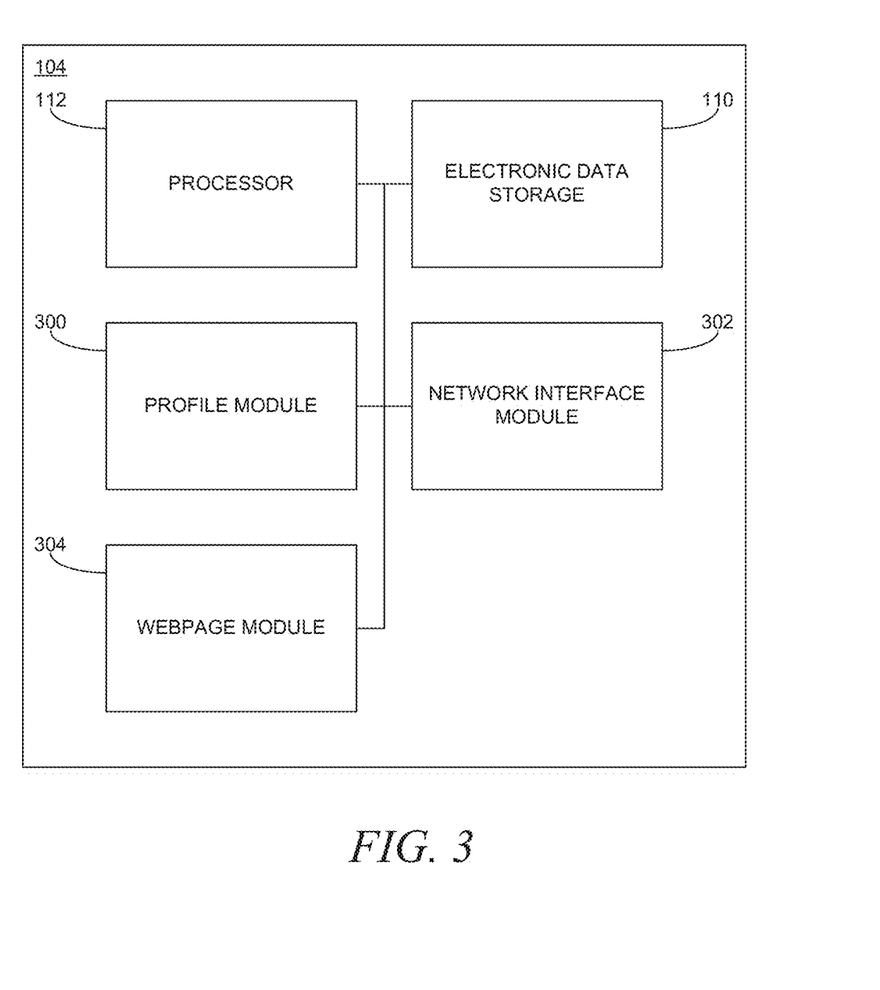
FIG. 3 is a block diagram of a server of a social network.

FIG. 3 is a block diagram of a simplified exemplary example of the server 104. In addition to the electronic data storage 110 and the processor 112, the server 104 can include modules to perform various aspects of serving the social network. In an example, the server 104 includes a profile generation module 300, a user interface module 302, and a webpage generation module 304. The various modules 300, 302, 304 can utilize the electronic data storage 110 and the processor 112 or can be wholly or partially implemented by and with the electronic data storage 110 and the processor 112. In various alternative examples, the modules 300, 302, 304 utilize dedicated and/or custom hardware, firmware, and software and can be implemented across multiple server platforms.

In an example, the profile generation module 300 is configured to compare the characteristics of the user, as described and listed herein, against a status of the viewer of the user's profile and select or create a profile 200A, 200B as appropriate. In the above example, the profile generation module 300 can note that the third party's status as an employee of "COMPANY X" means that the profile 200A, that simply refers to the user as "EMPLOYED," should be selected or generated. The profile generation module 300 can make direct comparisons between user characteristics and third party status, such as if the third party has its own social network profile of characteristics that map directly or essentially directly to various characteristics of the user. Alternatively, as described herein, the profile generation module 300 can make inferences as to the third party status, such as based on an Internet Protocol (IP) address or email address.

The user interface module 302 can incorporate hardware and software for communicative coupling to the user devices 102 by way of the network 108 as well known in the art. The webpage generation module 304 is configured to generate a webpage according to various standards and formats well known in the art. The webpage as generated can be based on some or all of the characteristics, and can take the form of the profiles 200A, 200B illustrated herein. The webpage generation module 304 is not limiting and can create graphic or text presentations of the user profiles 200A, 200B in formats not limited to a webpage.

Figure 4:
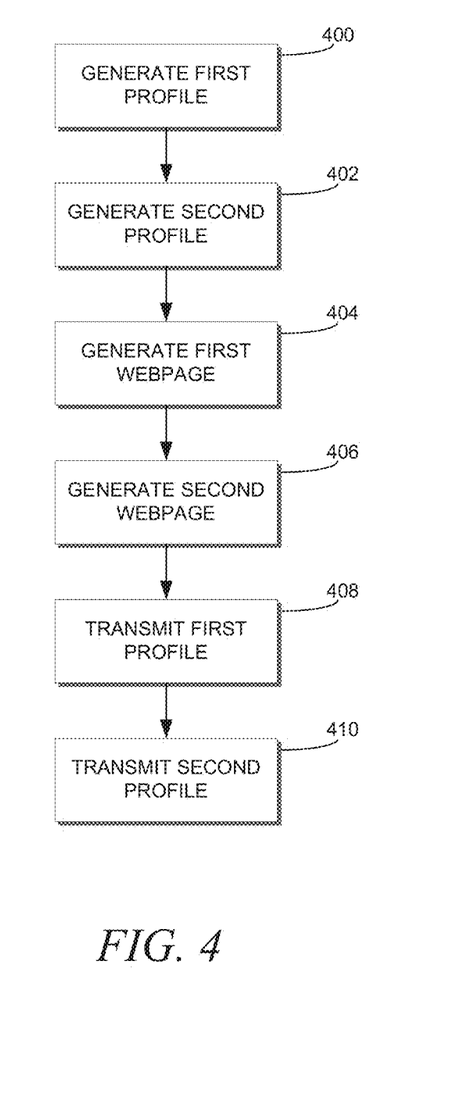
FIG. 4 is a flowchart for transmitting variable profiles to a third party.

FIG. 4 is a flow diagram illustrating an example of the method operations involved in a method of pre-processing user profiles with a characteristic extraction engine to generate enhanced profiles for use by a matching engine. In some examples, some of the method operations illustrated in FIG. 7 may be performed offline by means of a batch process that is performed periodically (e.g., two times a day, daily, weekly, and so forth), while in other examples, the method operations may be performed online and in real-time as requests for similar user profiles and job profiles are being received and processed.

At 400, the profile generation module 300 generates a first profile, such as can be displayed on the first page 200A, of a user of a social network based, at least in part, on a first plurality of characteristics related to the user. In various examples, characteristics of the first and second plurality of characteristics comprise an employer, an age, a familial relationship, a mutual friend of acquaintance, a comparative location, a related educational background, and a related club or organization membership.

At 402, the profile generation module 300 generates a second profile, such as can be displayed on the second page 200B, of the user based, at least in part, on a second plurality of characteristics related to the user, at least one of the first plurality of characteristics being the same as at least one of the second plurality of characteristics and at least one of the first plurality of characteristics being different from at least one of the second plurality of characteristics. In an example, the first criterion is inconsistent with the second criterion, i.e., the two criteria cannot both be true. In such an example, only one profile is transmitted to any one third party.

In an example, the first profile is configured to indicate a first job status of the user and the second profile is configured to indicate a second job status of the user. In such an example, the first profile is transmitted (below at 408) to the third party if the third party is associated with an employer of the user. In such an example, the second profile is transmitted (below at 410) to the third party if the third party is not associated with the employer of the user. In such an example, the first profile indicates no prospective change in employment for the user and wherein the second profile indicates a prospective change in employment for the user.

At 404, the webpage generation module 304 generates a first webpage based, at least in part, on the first profile.

At 406, the webpage generation module 304 generates a second webpage based, at least in part, on the second profile. In various examples, the first and second webpages are configured to display at least some of the characteristics of the first and second profiles, respectively.

At 408, the network interface module 302 transmits the first profile to a device of a third party, such as the user device 104, based on the third party meeting a first criterion. In an example, the first criterion and the second criterion are compared against a status of the third party, such as, in the above example, to determine whether the third party is associated with an employer of the user.

In various examples, the status of the third party corresponds to at least one of a non-professional acquaintance of the user, a current employer of the user, a prospective employer of the user, and an entity unaffiliated with the user.

At 410, the network interface module 302 transmits the second profile to a device of the third party, such as the user device 104, based on the third party meeting a second criterion. In an example, the first profile corresponds to a first type of profile and wherein the second profile corresponds to a second type of profile, wherein the first type is configured to be transmitted based on the third party corresponding to a first status and the second type is configured to be transmitted based on the third party corresponding to a second status different from the first status. In the above example, the first type of profile is a profile configured to convey that the user is employed while the second type of profile is configured to convey that the user is employed but looking for work.

Figure 5:
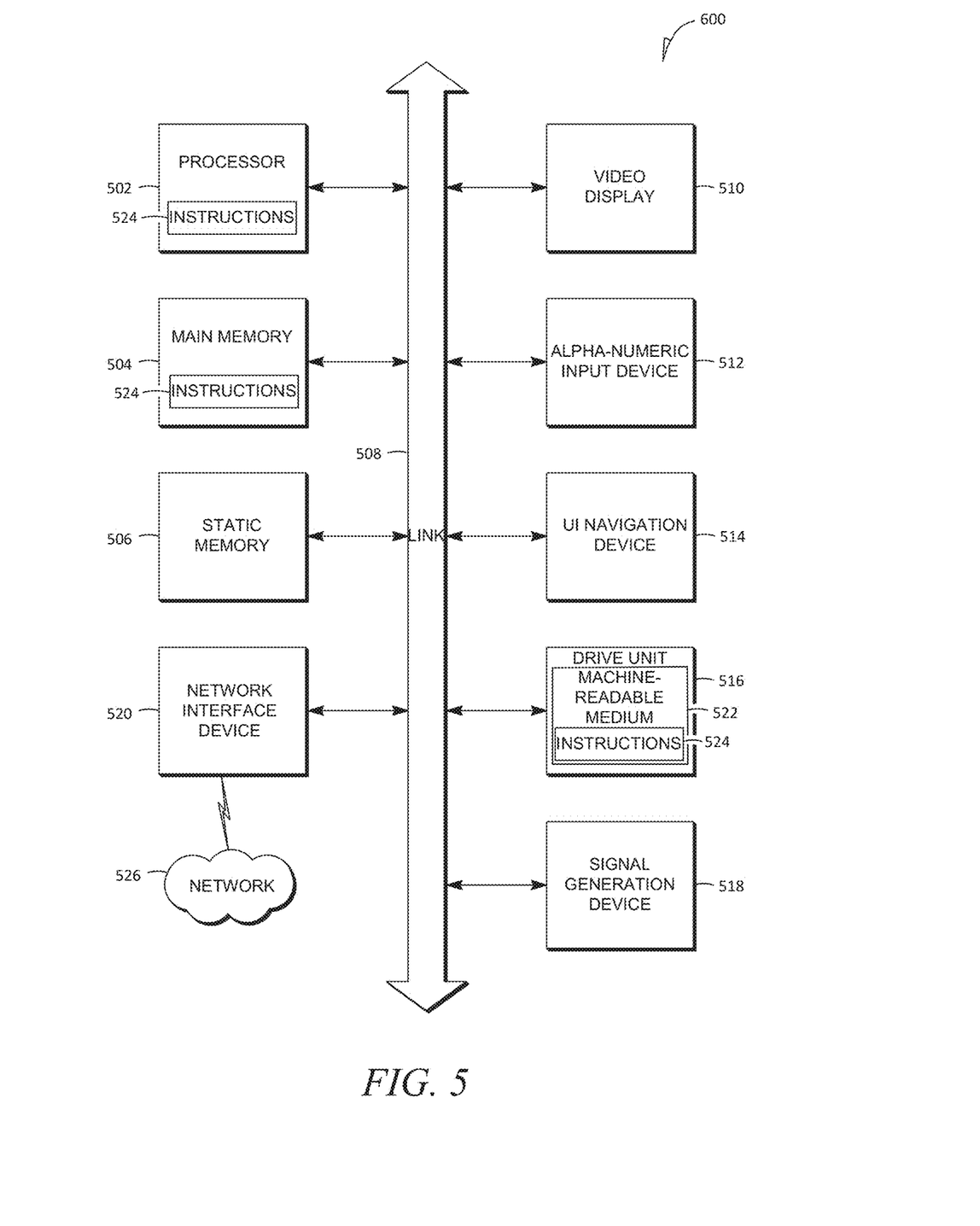
FIG. 5 is a block diagram illustrating components of a machine able to read instructions from a machine-readable medium.

FIG. 5 is a block diagram illustrating components of a machine 500, according to some example examples, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software) for causing the machine 500 to perform any one or more of the methodologies discussed herein may be executed. In alternative examples, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 500), such that the instructions, when executed by one or more processors of the machine (e.g., processor 502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A non-transitory memory device, the memory device communicatively coupled to a processor and comprising instructions which, when performed on the processor, cause the processor to perform operations comprising:
    generate a first profile of a user of a social network, the first profile having a plurality of fields with values based, at least in part, on a first plurality of stored characteristics related to the user and store the first profile in a network database, wherein the first profile is configured to store fields including a name of the user, an image, a job title, a current employer, a location, work history, contact information, and a job status of the user indicating no prospective change in employment;
    generate a second profile of the user, the second profile having a plurality of fields with values based, at least in part, on a second plurality of stored characteristics related to the user and store the second profile in the network database, at least one of the first plurality of stored characteristics being the same as at least one of the second plurality of stored characteristics and at least one of the first plurality of stored characteristics being different from at least one of the second plurality of stored characteristics, wherein the second profile is configured to store fields including the name of the user, the image, the job title, the current employer, the location, the work history, the contact information, and the job status of the user indicating a prospective change in employment;
    receive, via a network interface, a request to display a profile of the user on a device of a third party based on receipt of a user identifier transmitted by the third party being associated with the user;
    responsive to receipt of the request, performing, upon receipt of the request, the steps of:
        analyze a profile of the third party in relation to an employer of the user to generate an analysis by comparing the current employer of the user against a status of the third party;
        determine, based on the analysis, an association of the third party to the employer of the user;
        based on a determination that the third party is associated with the employer of the user, generate a first webpage with fields corresponding to the fields of the first profile, where the fields of the first webpage are populated with the values of the first profile;
        based on a determination that the third party is not associated with the employer of the user, generate a second webpage with fields corresponding to the fields of the second profile, where the fields of the second webpage are populated with the values of the second profile; and
        transmit, via the network interface, the first webpage or second webpage to the device of the third party.

2. The memory device of claim 1, wherein the status is at least one stored characteristic of the third party.

3. The memory device of claim 2, wherein the at least one stored characteristic of the third party is at least one of: a non-professional acquaintance of the user, a current employer of the user, a prospective employer of the user, or an entity unaffiliated with the user.

4. The memory device of claim 1, wherein characteristics of the first and second plurality of stored characteristics comprise an employer, an age, a familial relationship, a mutual friend of acquaintance, a comparative location, a related educational background, and a related club or organization membership.

5. The memory device of claim 1, wherein the first and second webpages are configured to display at least some of the fields of the first and second profiles, respectively.

6. A system comprising: a non-transitory memory device, the memory device communicatively coupled to a processor and comprising instructions which, when performed on the processor, cause the processor to perform operations comprising:
    generate a first profile of a user of a social network, the first profile having a plurality of fields with values based, at least in part, on a first plurality of stored characteristics related to the user and store the first profile in a network database, wherein the first profile is configured to store fields including a name of the user, an image, a job title, a current employer, a location, work history, contact information, and a job status of the user indicating no prospective change in employment; and
    generate a second profile of the user, the second profile having a plurality of fields with values based, at least in part, on a second plurality of stored characteristics related to the user and store the second profile in the network database, at least one of the first plurality of stored characteristics being the same as at least one of the second plurality of stored characteristics and at least one of the first plurality of stored characteristics being different from at least one of the second plurality of stored characteristics, wherein the second profile is configured to store fields including the name of the user, the image, the job title, the current employer, the location, the work history, the contact information, and the job status of the user indicating a prospective change in employment; and receive, via a network interface, a request to display a profile of the user on a device of a third party based on receipt of a user identifier transmitted by the third party being associated with the user;

responsive to receipt of the request, performing, upon receipt of the request, the steps of:

analyze a profile of the third party in relation to an employer of the user to generate an analysis by comparing the current employer of the user against a status of the third party;

determine, based on the analysis, an association of the third party to the employer of the user;

based on a determination that the third party is associated with the employer of the user, generate a first webpage with fields corresponding to the fields of the first profile, where the fields of the first webpage are populated with the values of the first profile;

based on a determination that the third party is not associated with the employer of the user, generate a second webpage with fields corresponding to the fields of the second profile, where the fields of the second webpage are populated with the values of the second profile; and     transmit, via the network interface, the first webpage or second webpage to the device of the third party.

7. The system of claim 6, wherein the status is at least one stored characteristic of the third party.

8. The system of claim 7, wherein the at least one stored characteristic of the third party is at least one of: a non-professional acquaintance of the user, a current employer of the user, a prospective employer of the user, or an entity unaffiliated with the user.

9. The system of claim 6, wherein characteristics of the first and second plurality of stored characteristics comprise an employer, an age, a familial relationship, a mutual friend of acquaintance, a comparative location, a related educational background, and a related club or organization membership.

10. The system of claim 6, wherein the first and second webpages are configured to display at least some of the fields of the first and second profiles, respectively.

11. A method, comprising:

generating, with a processor, a first profile of a user of a social network, the first profile having a plurality of fields with values based, at least in part, on a first plurality of stored characteristics related to the user and store the first profile in a network database, wherein the first profile is configured to store fields including a name of the user, an image, a job title, a current employer, a location, work history, contact information, and a job status of the user indicating no prospective change in employment;

generating, with the processor a second profile of the user, the second profile having a plurality of fields with values based, at least in part, on a second plurality of stored characteristics related to the user and store the second profile in the network database, at least one of the first plurality of stored characteristics being the same as at least one of the second plurality of stored characteristics and at least one of the first plurality of stored characteristics being different from at least one of the second plurality of stored characteristics, wherein the second profile is configured to store fields including the name of the user, the image, the job title, the current employer, the location, the work history, the contact information, and the job status of the user indicating a prospective change in employment;

receiving, via a network interface, a request to display a profile of the user on a device of a third party based on receipt of a user identifier transmitted by the third party being associated with the user;

responsive to receipt of the request, performing, upon receipt of the request, the steps of:

analyzing a profile of the third party in relation to an employer of the user to generate an analysis by comparing the current employer of the user against a status of the third party;

determining, based on the analysis, an association of the third party to the employer of the user;

based on a determination that the third party is associated with the employer of the user, generating a first webpage with fields corresponding to the fields of the first profile, where the fields of the first webpage are populated with the values of in the first profile;

based on a determination that the third party is not associated with the employer of the user, generating a second webpage with fields corresponding to the fields of the second profile, where the fields of the second webpage are populated with the values of the second profile; and         transmitting, via the network interface, the first webpage or second webpage, to the device of the third party.

12. The method of claim 11, wherein the status is at least one stored characteristic of the third party.

13. The method of claim 12, wherein the at least one stored characteristic of the third party is at least one of: a non-professional acquaintance of the user, a current employer of the user, a prospective employer of the user, or an entity unaffiliated with the user.

14. The method of claim 11, wherein characteristics of the first and second plurality of stored characteristics comprise an employer, an age, a familial relationship, a mutual friend of acquaintance, a comparative location, a related educational background, and a related club or organization membership.

\* \* \* \* \*